US009173240B2

(12) United States Patent
Jiang et al.

(10) Patent No.: US 9,173,240 B2
(45) Date of Patent: Oct. 27, 2015

(54) MOBILE TERMINAL AND METHOD AND SYSTEM FOR ESTABLISHING IP CONNECTION BETWEEN MOBILE TERMINALS

(75) Inventors: Min Jiang, Guangdong Province (CN); Zhifan Bao, Guangdong Province (CN); Dan Xue, Guangdong Province (CN); Qun Cheng, Guangdong Province (CN)

(73) Assignee: ZTE Corporation, Shenzhen City, Guangdong Province (CN)

( * ) Notice: Subject to any disclaimer, the term of this patent is extended or adjusted under 35 U.S.C. 154(b) by 756 days.

(21) Appl. No.: 13/508,350

(22) PCT Filed: Mar. 24, 2010

(86) PCT No.: PCT/CN2010/071275
§ 371 (c)(1), (2), (4) Date: Jun. 4, 2012

(87) PCT Pub. No.: WO2010/145249
PCT Pub. Date: Dec. 23, 2010

(65) Prior Publication Data
US 2012/0258744 A1 Oct. 11, 2012

(30) Foreign Application Priority Data
Nov. 5, 2009 (CN) .......................... 2009 1 0237220

(51) Int. Cl.
*H04W 4/14* (2009.01)
*H04W 76/02* (2009.01)
*H04W 80/04* (2009.01)

(52) U.S. Cl.
CPC .............. *H04W 76/022* (2013.01); *H04W 4/14* (2013.01); *H04W 80/04* (2013.01)

(58) Field of Classification Search
CPC ....................................................... H04W 4/14
USPC ............ 455/466, 412.1, 413, 414.1; 370/310, 370/352, 353, 473, 252
See application file for complete search history.

(56) References Cited

U.S. PATENT DOCUMENTS

| 7,125,336 | B2 * | 10/2006 | Anttila et al. .................. 463/40 |
| 7,933,965 | B2 * | 4/2011 | Bonar et al. .................. 709/208 |

(Continued)

FOREIGN PATENT DOCUMENTS

| CN | 101155360 A | 4/2008 |
| CN | 101167068 A | 4/2008 |

(Continued)

OTHER PUBLICATIONS

International Search Report for PCT/CN2010/071275 dated Jul. 20, 2010.

*Primary Examiner* — Michael T Vu
(74) *Attorney, Agent, or Firm* — Lin Wu; Stephen Yang; Ling and Yang Intellectual Property

(57) ABSTRACT

A method and system for establishing an Internet Protocol (IP) connection between mobile terminals and a mobile terminal for establishing an IP connection are disclosed. The method includes: a request terminal sending a request short message to a called terminal; the called terminal getting the program name by parse, searching out a corresponding end-to-end program in an end-to-end program list and displays it to a user after the request short message is detected and the user chooses to receive the short message; the end-to-end program of the called terminal sending a network connection request after the user starts the end-to-end program and inputs the IP address of the short message text; the end-to-end program of the request terminal performing an IP-based data interaction with the called terminal when the network connection request is monitored. This technical solution can establish an end-to-end IP connection between two mobile terminals rapidly and conveniently.

15 Claims, 5 Drawing Sheets

(56) References Cited

U.S. PATENT DOCUMENTS

| | | |
|---|---|---|
| 8,432,899 B2 * | 4/2013 | Naqvi .......................... 370/352 |
| 2005/0288045 A1 | 12/2005 | Yang et al. |
| 2006/0209802 A1 | 9/2006 | Kang et al. |
| 2007/0265023 A1 | 11/2007 | Bengtsson et al. |
| 2008/0227464 A1 * | 9/2008 | Suito .......................... 455/456.1 |

FOREIGN PATENT DOCUMENTS

| | | |
|---|---|---|
| CN | 101521855 A | 9/2009 |
| EP | 2082545 A1 | 7/2009 |

* cited by examiner

MOBILE TERMINAL AND METHOD AND SYSTEM FOR ESTABLISHING IP CONNECTION BETWEEN MOBILE TERMINALS

TECHNICAL FIELD

The present invention relates to mobile terminal connection technology in the communication systems, and more especially, to a mobile terminal, as well as a method and system for establishing an Internet Protocol connection between the mobile terminals.

BACKGROUND OF THE RELATED ART

In recent years, the mobile terminal data service application is more and more extensive. Since the mobile terminal does not have a fixed Internet Protocol (IP) address, when a user needs to access the Internet, the mobile terminal can obtain a dynamic IP address from the operator through dial-up Internet access. If the mobile terminal keeps accessing the Internet via the dial-up Internet access, it will occupy an IP address and occupy the network resource all the time, and consumes its own central processing unit (CPU) resources and its own electricity, resulting in reduced standby time. Therefore, when the user does not need to access the Internet, he/she disconnects the dial-up accessed network, and the IP address will be retrieved by the operator.

At present, online chat and online game via the mobile terminals are achieved mainly by the server forwarding the data, that is, the mobile terminal A sends the data to the server C, and then the server C sends the data to the mobile terminal B. Thus, it can be seen that the data transportation between the mobile terminals A and B depends on the server C, this method increases the network transportation time on the one hand; on the other hand, the server C might also charge; moreover, the data transported between the mobile terminals A and B might be intercepted by the server C, which pose a threat to the security of the data content.

Then, if the way of forwarding by the server is not used, in accordance with the related art, assuming that the users A and B want to play end-to-end networking game via the mobile terminals, as shown in FIG. 1, it is generally achieved by the following steps:

step 101: the user A notifies the user B of the networking game name by telephone, telecommunications, and so on;

step 102: the respective mobile terminals of the users A and B start the game program by dial-up Internet access;

step 103: the user A notifies the user B of the user A's own IP address again by telephone, telecommunications, and so on;

step 104: the user B inputs the IP address of the user A's mobile terminal in the mobile terminal's game program, and connects with the user A's mobile terminal through the game program;

step 105: start the networking game;

It is evident that the above method requires many times of manual operations, including: searching for IP address and making a notification, searching for the game name and making a notification, and so on; it is very cumbersome, time consuming and power consuming.

CONTENT OF THE INVENTION

In view of this, the main purpose of the present invention is to provide a mobile terminal as well as a method and system for establishing an Internet Protocol connection between the mobile terminals, to achieve the end-to-end IP data interaction between the two mobile terminals.

To achieve the aforementioned purpose, the technical solution of the present invention is accomplished as:

The present invention achieves a method for establishing an Internet Protocol connection between mobile terminals, comprising:

a request terminal connecting to a wireless network, starting an end-to-end program, and sending a request short message to a called terminal;

after the called terminal detects that the received short message is a request short message and a user chooses acception, the called terminal connecting to the wireless network, displaying the end-to-end program in the request short message to the user, after the user starts the end-to-end program and inputs an Internet Protocol (IP) address of a request short message text, the end-to-end program of the called terminal sending a network connection request to the request terminal;

when the request terminal's own end-to-end program monitors the network connection request, the request terminal performing IP-based data interaction with the called terminal.

In the above scheme, both the request terminal and the called terminal have an end-to-end program list, the request terminal selects an end-to-end program from the list and start the end-to-end program; said called terminal parses the request short message text to get a program name, and searches out the corresponding end-to-end program from the end-to-end program list according to the program name, and displays the end-to-end program to the user.

In the above scheme, after detecting that the received short message is a request short message, the method further comprising: when the user chooses rejection, returning a rejecting short message to the request terminal.

In the above scheme, after returning a rejecting short message to the request terminal, the method further comprising: after the request terminal detects that the received short message is a rejecting short message, displaying a text, and prompting a peer end to make a rejection.

In the above scheme, said sending a request short message is: sending a request short message in a request short message format preset by the request terminal and the called terminal; the request short message format is specifically: a first character is a request identity; a second character is a program name; and a third character is a delimiter; and a fourth character is an IP address of the request short message.

In the above scheme, said returning a rejecting short message is: returning a rejecting short message in a rejecting short message format preset by the request terminal and the called terminal; the rejecting short message format is specifically: a first character is a rejection identity; and a second character is a program name.

In the above scheme, when the called terminal cannot search out the corresponding end-to-end program in the end-to-end program list, the method further comprising: the called terminal prompting the user to search the end-to-end program manually.

In the above scheme, when the called terminal detects that the received short message is a request short message and the request short message contains a version number, the method further comprising: the user checking the version number before starting the end-to-end program, if the version number is consistent, starting the end-to-end program; otherwise, the user sending a short message to the request terminal as required to notify the request terminal of inconsistence of the version number.

In the above scheme, after the request terminal sends the request short message to the called terminal, the method further comprising: setting time in accordance with a preset time, and when the time expires, prompting the user to close the program.

The present invention achieves a system for establishing an Internet Protocol connection between mobile terminals, the system comprises:

a request terminal, used to start an end-to-end program after connecting to a wireless network, and send a request short message to a called terminal; and also used to perform IP-based data interaction with the called terminal when the end-to-end program of the request terminal monitors a network connection request;

a called terminal, used to connect to the wireless network when detecting that the received short message is a request short message and the user accepts the request, and to display the end-to-end program in the request short message to the user, after the user starts the end-to-end program and inputs an IP address of the request terminal, the called terminal's own end-to-end program sending the network connection request to the request terminal;

a wireless network, used to provide a data interaction platform for the request terminal and the called terminal.

In the above scheme, the request terminal comprises:

a first Internet accessing module, used to connecting to a wireless network before starting the end-to-end program;

a first list creating module, used to create an end-to-end program list, and store the end-to-end program thereof in a list in advance in accordance with a program name, a path, and a version number;

a request module, used to send a request short message to the called terminal when starting the end-to-end program;

a first short message receiving module, used to receive a short message and display text of the short message;

a first data interacting module, used to perform IP-based data interaction with the called terminal when the first data interacting module's own end-to-end program monitors a network connection request.

In the above scheme, the called terminal comprises:

a second list creating module, used to create an end-to-end program list, and store all of the second list creating module's own end-to-end programs in a list in advance in accordance with the program name, the path, and the version number;

a second short message receiving module, used to display text of the request short message after detecting that the short message is a request short message, to prompt the user to accept the request, and when the user chooses to accept the request, to inform a second Internet accessing module and a parsing module;

a second Internet accessing module, used to connecting to a wireless network before starting the end-to-end program;

a parsing module, used to parse the text of the received request short message to get the program name and send the program name to a searching module;

a searching module, used to search the end-to-end program in the end-to-end program list thereof according to the program name, when the program is searched out, to display the program to the user; otherwise, to prompt the user to search the program manually;

a second data interacting module, used to send the network connection request to the request terminal via the end-to-end program after the user starts the end-to-end program displayed by the searching module and inputs the request terminal's IP address.

In the above scheme, the called terminal is further used to return a rejecting short message to the request terminal after the received short message is detected as a request short message and the user rejects the request; and also used to prompt the user to search the end-to-end program manually when the corresponding end-to-end program cannot be searched out in the end-to-end program list;

the request terminal is further used to display the text and prompt a peer end to reject the request after the received short message is detected as a rejecting short message.

In the above scheme, the request terminal further comprises: a timing module, used to set a time in accordance with a preset time after sending the request short message, and when the time expires, to prompt the user to close the program; and/or the request terminal further comprises: a version number inputting module, used to prompt the user to input the version number when the request module adds the text of the short message;

the request module is further used to add the version number input by the user into the text of the short message;

the first data interacting module is further used to close the timing module when the end-to-end program thereof monitors the network connection request;

the first short message receiving module is further used to prompt a peer end to reject the request and close the timing module when the short message is detected as a rejecting short message;

the called terminal also comprises a rejecting module used to return the rejecting short message to the request terminal;

the second short message receiving module is further used to prompt the user to reject the request and notify the rejecting module when the user chooses to reject the request.

The present invention achieves a mobile terminal for establishing an Internet Protocol connection, when working as a request terminal, and the mobile terminal comprises:

a first Internet accessing module, used to connecting to a wireless network before starting an end-to-end program;

a first list creating module, used to store the end-to-end program thereof in a list in advance in accordance with a program name, a path, and a version number;

a request module, used to send a request short message to a specified terminal when starting the end-to-end program;

a first short message receiving module, used to receive a short message and display text of the short message;

a first data interacting module, used to perform IP-based data interaction with the specified terminal when the end-to-end program thereof monitors a network connection request;

when working as a called terminal, the mobile terminal comprising:

a second Internet accessing module, used to connecting to a wireless network before starting an end-to-end program;

a second list creating module, used to create an end-to-end program list and store all end-to-end programs thereof in a list in advance in accordance with the program name, the path, and the version number;

a second short message receiving module, used to, after detecting a request short message, display the text of the request short message, prompt the user to accept the request, and, when an accepting button is pressed, to notify the second Internet accessing module and the parsing module;

a second data interacting module, used to send a network connection request via the end-to-end program to a terminal sending the request short message after the user starts the end-to-end program displayed by a searching module and inputs an IP address in the request short message;

a parsing module, used to parse the text of the received request short message to get the program name and send the program name to a searching module;

a searching module, used to search the end-to-end program in the end-to-end program list thereof according to the program name, and when the end-to-end program is searched out, display the end-to-end program to the user; otherwise, prompt the user to search the end-to-end program manually.

The present invention provides a method and system for establishing an Internet Protocol connection between mobile terminals, the request terminal sends a request short message to the called terminal in accordance with the agreed request format; after the called terminal detects that the short message is a request short message and the user accepts the request, it parses the short message text to get the program name, searches out the corresponding end-to-end program in itself, and displays it to the user, after the user starts the end-to-end program and inputs the IP address in the request short message, it sends a network connection request to the request terminal; the end-to-end program of the request terminal monitors the network connection request and performs the IP-based data interaction with the called terminal; in this way, the request terminal can perform an end-to-end IP data interaction with the called terminal, the solution of the present invention uses the short message to carry the IP address that the user cares about, the end-to-end program name, and other information, to quickly and easily establish the IP connection between two mobile terminals, at the same time, it does not need the support of a third-party server, thereby reducing the network transportation time and improving the network efficiency; moreover, the data does not need to via a third-party server, which increases the data security.

PREFERRED EMBODIMENTS OF THE PRESENT INVENTION

The basic idea of the present invention is: the request terminal sends a request short message to the called terminal in accordance with the agreed request format; after the called terminal detects that the short message is a request short message and the user accepts the request, the called terminal parses the text of the short message to get the program name, searches out the corresponding end-to-end program in itself, and displays it to the user, after the user starts the corresponding end-to-end program, the called terminal uses the IP address in the request short message input by the user via the end-to-end program to send a network connection request to the request terminal; the end-to-end program of the request terminal monitors the network connection request and performs the IP-based data interaction with the called terminal.

The request short message comprises the request ID, the program name, its own IP address, and other information;

the agreed request format is the request short message format pre-configured by the request terminal and the called terminal, in general as shown in Table 1, the first character is the request identity to identify the type of the short message, it is an invisible character whose value might be 0x75; the second character is the program name; the third character is a delimiter; the fourth character is the version number; the fifth character is a delimiter; the sixth character is its own IP address; the version number is optional, and when the version number is not configured in advance, the fourth character might be its own IP address.

TABLE 1

| Request ID | Program name | Delimiter | Version number | Delimiter | IP address |
|---|---|---|---|---|---|
| 0x75 | xx | ; | | ; | xx.xx.xx.xx |

In the following, the present invention will be described in further detail in combination with the accompanying drawings and specific embodiments.

Figure 1:
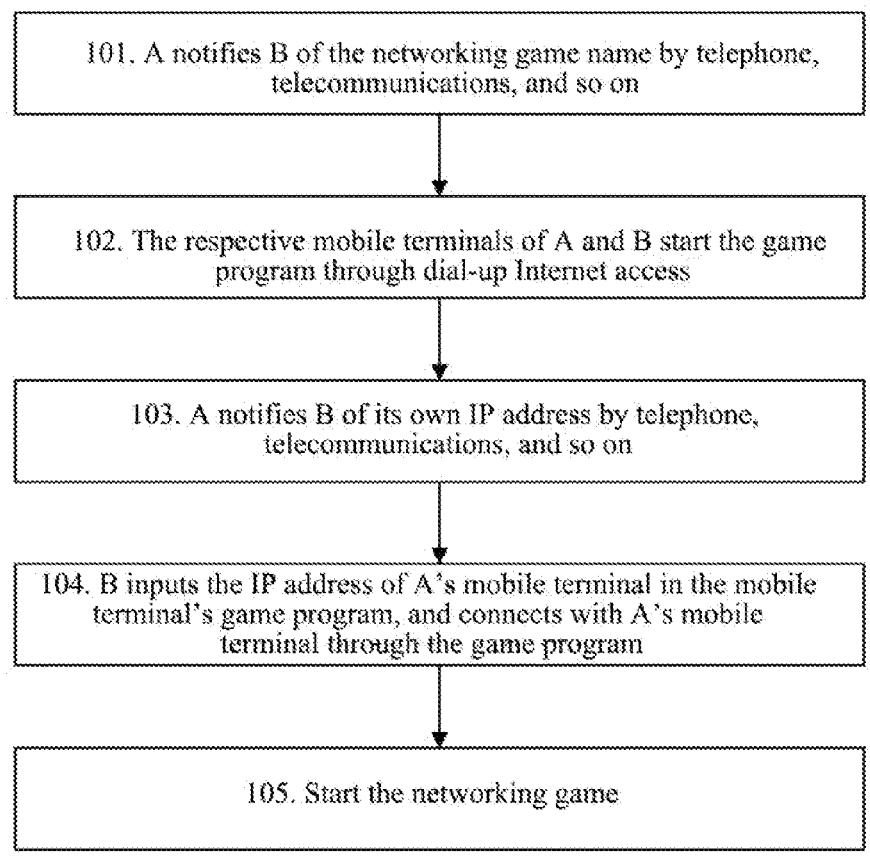
FIG. 1 is a flow chart of a method for the users A and B performing end-to-end networking game via the mobile terminals in the related art.
Figure 2:
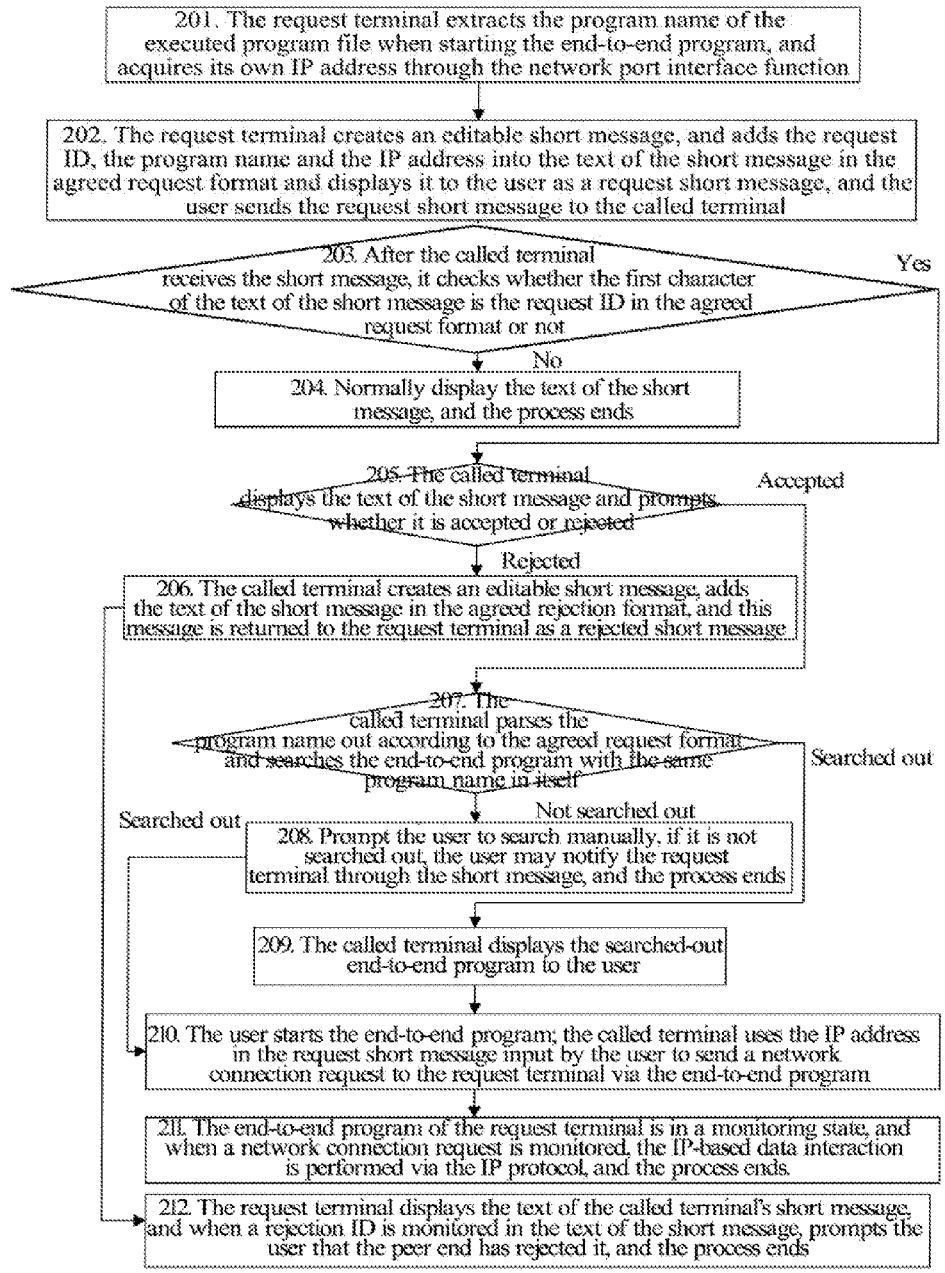
FIG. 2 is a flow chart of a method for establishing an Internet Protocol connection between the mobile terminals in accordance with the present invention.

The method for establishing an Internet Protocol connection between the mobile terminals according to the present invention, as shown in FIG. 2, comprises the following steps:

step 201: the request terminal extracts the program name of the executed program file when starting the end-to-end program, and acquires its own IP address through the network port interface function;

specifically, create the end-to-end program lists for the request terminal and the called terminal respectively in advance, that is, the respective end-to-end programs of the request terminal and the called terminal are stored in a list in accordance with the program name, the path, and the version number; after the request terminal connects to the wireless network, the user chooses an end-to-end program in the end-to-end program list, the request terminal starts the end-to-end program according to the path in the list, meanwhile, extracts the program name of this program in the list; and obtains its own IP address via the network port interface function of the mobile terminal's own operating system, for example: when the operating system is the BREW, the network port interface function INETMGR_GetMyIPAddr( ) is called to return its own IP address;

step 202: the request terminal creates an editable short message, and adds the request ID, the program name and the IP address into the text of the short message in accordance with the agreed request format and displays it to the user as a request short message, and sends the request short message to the called terminal in accordance with the called terminal number input by the user;

specifically, the request terminal creates an editable short message via its own short message unit, and in accordance with the agreed request format, adds the request ID into the first character of the text of the short message, add the program name into the second character, add the delimiter ";" into the third character, and add its own IP address into the fourth character, therefore, after a request short message is created, it is displayed to the user, and the user inputs the called terminal number in accordance with the short message sending method, and the request terminal sends the request short message to the called terminal according to the called terminal number;

furthermore, in this step, if the agreed request format comprises the version number, the request terminal prompts the user to input the version number, and after the user inputs the version number, the version number is taken as the fourth character of the text of the request short message, a delimiter ";" is added into the fifth character; and the sixth character is its own IP address.

Furthermore, this step also comprises that the request terminal sets a timer after the request terminal sends a request short message to the called terminal, generally the timer is selected as three minutes as desired, when a rejecting short message is received or the end-to-end program monitors a network connection request before the timer expires, stop the timer; if the timer expires, prompt the user to close the end-to-end program.

Step 203: after the called terminal receives the short message, it checks whether the first character of the text of the short message is the request ID in the agreed request format or not, if no, proceed to step 204; otherwise, proceed to step 205;

step 204: normally display the text of the short message, and the process ends;

step 205: the called terminal displays the text of the request short message to the user, to prompt the user whether to accept or reject it, the accepting button is pressed when the user chooses to accept it, proceed to step 207; otherwise, the rejecting button is pressed, and proceed to step 206;

step 206: the called terminal creates an editable message, adds the text of the short message in accordance with the agreed rejecting format, and this message is taken as a rejecting short message to be returned to the request terminal, proceed to step 212;

in this step, the rejecting short message comprises the rejecting ID, the program name, and other information;

the agreed rejecting format is the rejecting short message format pre-configured by the request terminal and the called terminal, as shown in Table 2, the first character is the rejecting ID which is used to identify the type of short message, it is an invisible character whose value might be 0x76; the second character is the program name; the third character is a delimiter; the fourth character is the version number; the version number is optional, and the version number might not be preset.

TABLE 2

| Request ID | Program ID | Delimiter | Version number | Delimiter |
|---|---|---|---|---|
| 0x76 | xx | ; |  | ; |

Step 207: the called terminal gets the program name by parse according to the agreed request format and searches the end-to-end program with the same program name in itself, if the program is searched out, proceed to step 209; otherwise, proceed to step 208;

specifically, the called terminal connects to a wireless network, and parses the text of the short message to get the program name in accordance with the agreed request format, and searches the end-to-end program with the same program name in its own end-to-end program list, if the program cannot be searched out, proceed to step 208; otherwise, proceed to step 209;

step 208: the called terminal prompts the user to search manually, if it is not searched out, the user notifies the request terminal through the short message; otherwise, proceed to step 210;

step 209: the called terminal displays the searched-out end-to-end program to the user;

step 210: the user starts the end-to-end program, the called terminal uses the IP address in the request short message input by the user to send a network connection request to the request terminal via the end-to-end program;

specifically, the user starts the end-to-end program based on the displayed end-to-end program, and when the end-to-end program requests for inputting the IP address of the peer end, the user inputs the request terminal's IP address displayed in the request short message text, the end-to-end program of the called terminal sends a network connection request according to the input IP address;

furthermore, this step also comprises: if the request short message text displayed in the step 205 has the version number, the user checks the version number before starting the end-to-end program, if the version number is consistent, start the end-to-end program; otherwise, the user sends a short message to the request terminal as needed to notify the inconsistence of the version number, and the process ends.

Step 211; the end-to-end program of the request terminal is in a monitoring state, and when a network connection request is monitored, the IP-based data interaction is performed via the IP protocol, and the process ends.

Step 212: the request terminal displays the called terminal's short message text, and when a rejecting ID is monitored in the short message text, prompts the user that the peer end rejects it, and the process ends;

specifically, after the request terminal receives the short message, it displays the short message text, and detects the first character of the short message text, when the first character is a rejecting ID with the agreed rejecting format, prompts the user that the peer end rejects it, and the process ends; when the first character is not a rejecting ID, normally displays the short message text, and the process ends.

The above request terminal and the called terminal are provided with a data interaction platform by the wireless network.

Figure 3:
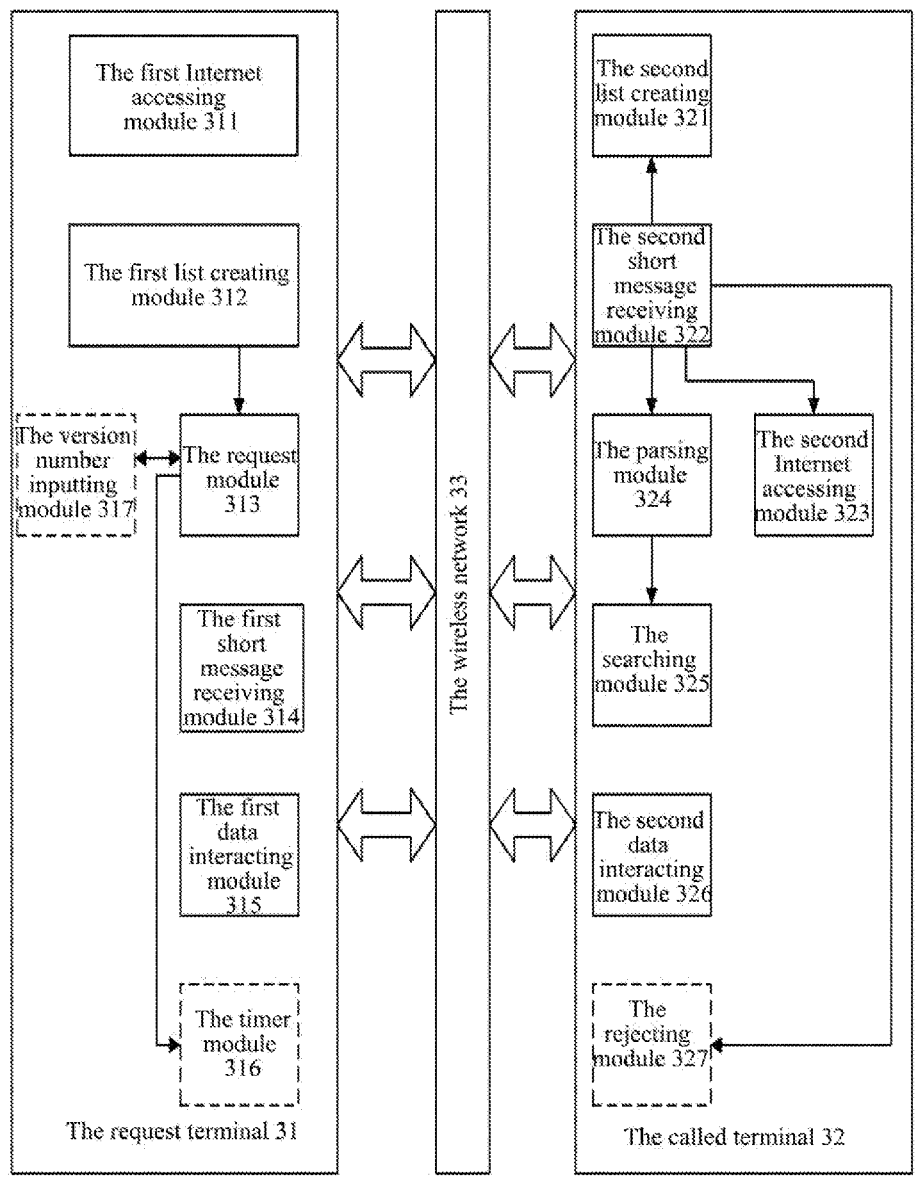
FIG. 3 is a structural diagram of a system for establishing an Internet Protocol connection between the mobile terminals in accordance with the present invention.

Based on the aforementioned method, the present invention also provides a system for establishing an Internet protocol connection between the mobile terminals, as shown in FIG. 3, the system comprises: the request terminal 31, the called terminal 32, and the wireless network 33; wherein, the request terminal 31 is used to start an end-to-end program from an end-to-end program list after accessing a wireless network, and send a request short message to the called terminal 32 according to the agreed request format; it is also used to perform an IP-based data interaction with the called terminal 32 when its own end-to-end program monitors a network connection request, as well as display the short message text and prompt the peer end to reject it when the received short message is detected as a rejecting short message;

the called terminal 32 is used to prompt the user to accept or reject it when the received short message is detected as a request short message, if the accepting button is pressed, access the wireless network, parse the request short message text to get the program name, and search the corresponding end-to-end program in the end-to-end program list according to the program name, if the program is searched out, display the end-to-end program to the user, after the user starts the end-to-end program and inputs the request terminal's IP address, its own end-to-end program sends the network connection request to the request terminal 31; otherwise, prompt the user to search manually; if the rejecting button is pressed, return a rejecting short message to the request terminal 31 according to the agreed rejecting format;

the wireless network 33 is used to provide a data interaction platform for the request terminal 31 and the called terminal 32;

the request terminal 31 is also used to set a timer after sending the request short message to the called terminal 32, if a rejecting short message is received or its own end-to-end program monitors a network connection request before the timer expires, stop the timer; otherwise, prompt the user to close the end-to-end program;

the request terminal 31 further comprises: the first Internet accessing module 311, the first list creating module 312, the request module 313, the first short message receiving module 314, and the first data interacting module 315; wherein, the first Internet accessing module 311 is used to access the wireless network 33 before starting the end-to-end program;

the first list creating module 312 is used to create an end-to-end program list, that is, store its own end-to-end program in a list in advance in accordance with the program name, the path, and the version number;

the request module 313 is used to extract the program name of the executed program file in the end-to-end program list when starting the end-to-end program, and acquires its own IP address via its operating system's network port interface function; and then, create an editable short message and add the request ID, the program name and its own IP address into the short message text according to the agreed request format, and display the short message to the user as a request short message, after the user inputs the called terminal number, the user sends it to the called terminal 32;

the first short message receiving module 314 is used to receive a short message and display the short message text, and check the first character of the short message text, when the first character is detected as a rejecting ID, prompt the peer end to reject it;

the first data interaction module 315 is used to perform IP-based data interaction with the called terminal when its own end-to-end program monitors the network connection request;

furthermore, the request terminal 31 also comprises: the timing module 316, which is used to set a time in accordance with the preset time after sending the request short message, and when the set time expires, prompt the user to close the program;

the request terminal 313 is further used to notify the timing module 316 after sending the request short message;

the first data interacting module 315 is further used to close the timing module 316 when its own end-to-end program monitors the network connection request;

the first short message receiving module 314 is further sued to close the timing module 316 when the ID is detected as a rejecting ID;

when the agreed request format has the version number, the request terminal further comprises: the version number inputting module 317, which is used to prompt the user to input the version number when the request module 313 adds the short message text;

the request module 313 is further used to add the version number input by the user into the short message text according to the agreed request format.

Figure 4:
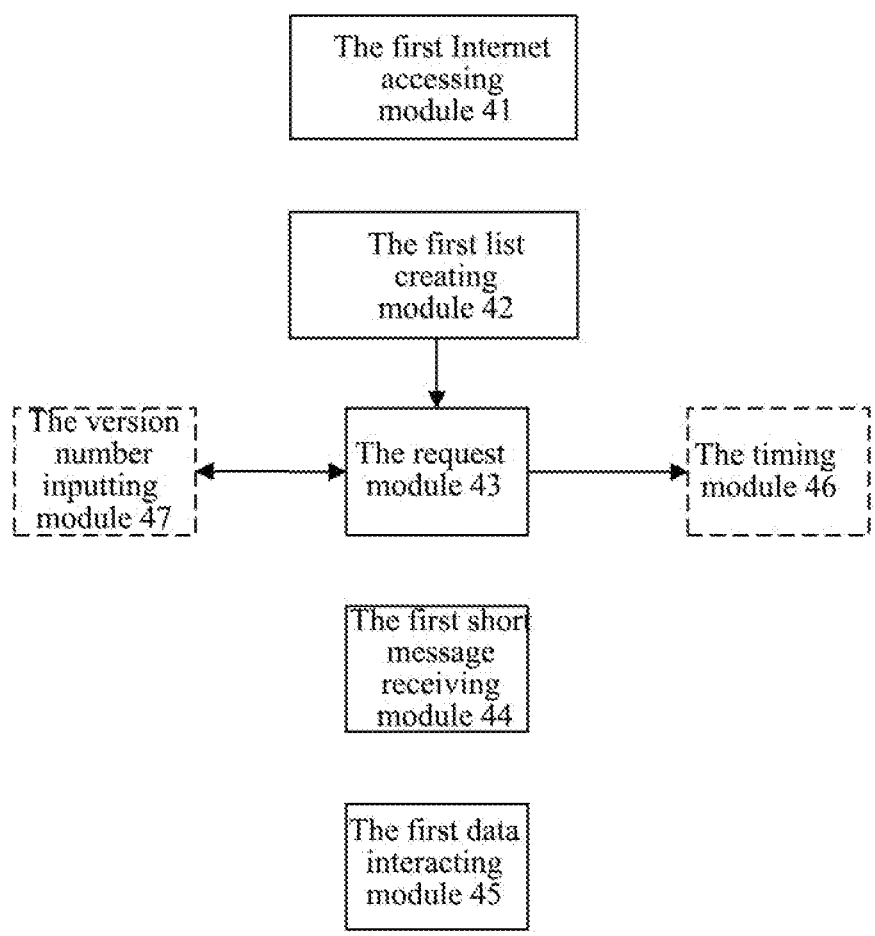
FIG. 4 is a structural schematic diagram of the mobile terminal for establishing an Internet protocol connection when working as a request terminal in accordance with the present invention.
Figure 5:
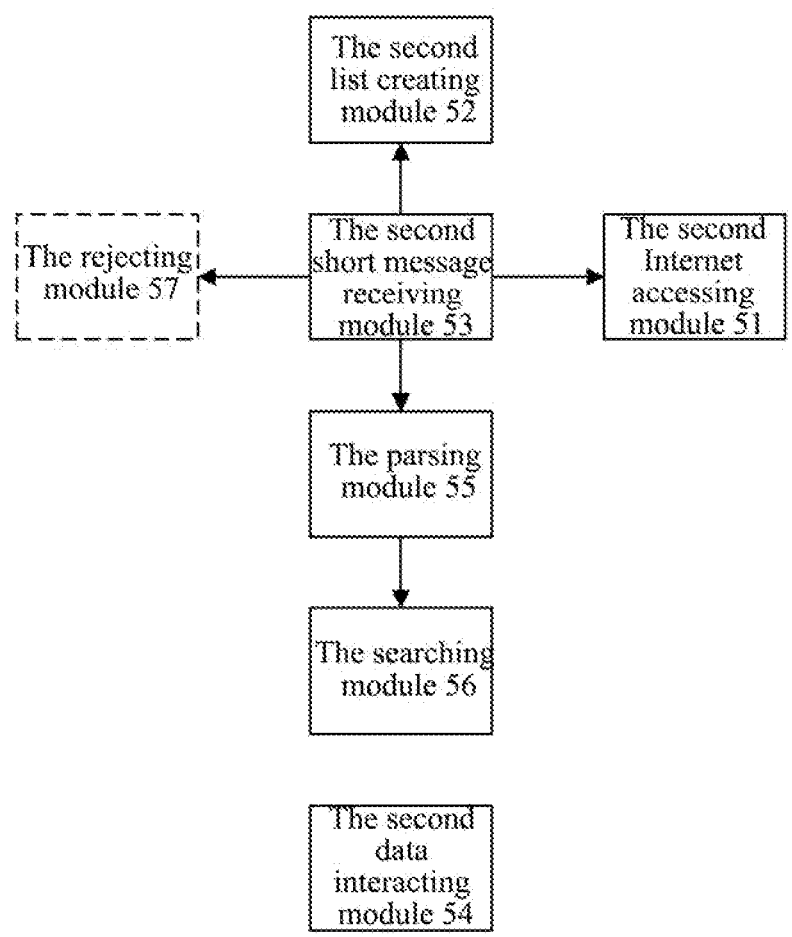
FIG. 5 is a structural schematic diagram of the mobile terminal for establishing an Internet protocol connection when working as a called terminal in accordance with the present invention.

The called terminal 32 further comprises: the second list creating module 321, the second short message receiving module 322, the second Internet accessing module 323, the parsing module 324, the searching module 325, the second data interacting module 326, and the rejecting module 327; wherein, the second list creating module 321 is used to create an end-to-end program list, that is, store its own end-to-end program in a list in advance in accordance with the program name, the path, and the version number;

the second short message receiving module 322 is used to display the request short message text after detecting that the short message is a request short message, prompt the user to accept or reject it, when the user presses the accepting button, inform the second Internet accessing module 323 and the parsing module 324; when the user presses the rejecting button, inform the rejecting module 327;

the second Internet module 323 is used to access the wireless network 33 before starting the end-to-end program;

the parsing module 324 is used to parse the received request short message text to get the program name according to the agreed request format and send it to the searching module 325;

the searching module 325 is used to search the end-to-end program in its own end-to-end program list according to the program name, when the program is searched out, display it to the user; otherwise, prompt the user to search manually;

the second data interacting module 326 is used to send the network connection request to the request terminal 31 via the end-to-end program after the user starts the end-to-end program displayed by the searching module and inputs the request terminal's IP address;

the rejecting module 327 is used to return a rejecting short message to the request terminal 31 according to the agreed rejecting format;

Based on the aforementioned method and system, the present invention also provides a mobile terminal for establishing an Internet Protocol connection, as shown in FIG. 4, when the mobile terminal is taken as the request terminal, the mobile terminal comprises the first Internet accessing module 41, the first list creating module 42, the request module 43, the first short message receiving module 44, and the first data interaction module 45; wherein, the first Internet accessing module 41 is used to access a wireless network before starting an end-to-end program;

the first list creating module 42 is used to create an end-to-end program list, that is store its own end-to-end program in a list in advance in accordance with the program name, the path, and the version number;

the request module 43 is used to extract the program name of the executed program file in the end-to-end program list when starting the end-to-end program, and acquires its own IP address via its operating system's network port interface function; create an editable short message and add the request ID, the program name and its own IP address into the short message text according to the agreed request format, and display the short message to the user as a request short message, after the user inputs the specified terminal number, the user sends it to the specified terminal;

the first short message receiving module 44 is used to receive the short message and display the short message text, and detect the first character of the short message text, when the short message is detected as a rejecting short message, prompt the peer end to reject it;

the first data interacting module 45 is used to perform the IP-based data interacting with the specified terminal when its own end-to-end program monitors the network connection request after the request module 43 sends a request short message;

furthermore, the mobile terminal also comprises: the timing module 46, which is used to set a time according to the preset time after sending the request short message, when the set time expires, prompt the user to close the program;

the request module 43 is further used to notify the timing module 46 after sending the request short message;

the first data interacting module 45 is further used to close the timing module 46 when its own end-to-end program monitors the network connection request;

the first short message receiving module 44 is further used to close the timing module 46 when the short message is detected as a rejecting short message;

when there is the version number in the agreed request format, the mobile terminal further comprises: the version number inputting module 47, which is used to prompt the user to input the version number when the request module adds the short message text;

the request module 43 is further used to add the version number input by the user into the short message text according to the agreed request format;

As shown in FIG. 5, when the mobile terminal is taken as the called terminal, it comprises the second Internet accessing module 51, the second list creating module 52, the second short message receiving module 53, the second data interacting module 54, the parsing module 55, and the searching module 56; wherein, the second Internet accessing module 51 is used to access a wireless network before starting an end-to-end program;

the second list creating module 52 is used to create an end-to-end program list, that is store its own end-to-end program in a list in advance in accordance with the program name, the path, and the version number;

the second short message receiving module 53 is used to, after detecting that it is a request short message, display the request short message text, and prompt the user to accept or reject it, when the accept button is pressed, notify the second Internet accessing module 51 and the parsing module 55;

the second data interacting module 54 is used to send the network connection request to the terminal which sends the request short message via the end-to-end program after the user starts the end-to-end program displayed by the searching module and inputs the IP address in the request short message;

the parsing module 55 is used to parse the received request short message text to get the program name according to the agreed request format and send the program name to the searching module 56;

the searching module 56 is used to search the end-to-end program in its own end-to-end program list according to the program name, and when the end-to-end program is searched out, display it to the user; otherwise, prompt the user to search the end-to-end program manually.

Furthermore, the mobile terminal also comprises: the rejecting module 57, which is used to return a rejecting short message to the terminal which sends the request short message in accordance with the agreed rejecting format;

the second short message receiving module 53 is further used to notify the rejecting module 57 to return a rejecting short message when the rejecting button is pressed.

INDUSTRIAL APPLICABILITY

With the present invention, the end-to-end IP data interaction between the request terminal and the called terminal can be achieved, by using the short message to carry the IP address that the user cares about, the end-to-end program name, and other information, the IP connection between two mobile terminals can be established quickly and easily, at the same time, it does not need the support of a third-party server, thereby reducing the network transportation time and improving the network efficiency; moreover, the data does not need to be transmitted via a third-party server, which increases the data security.

The above description is only the preferred embodiments of the present invention, and it is not intended to limit the protection scope of the present invention, any change, equivalent replacement and improvement made within the spirit and principles of the present invention shall be included in the protection scope of the present invention.

What is claimed is:

1. A method for establishing an Internet Protocol (IP) connection between mobile terminals, comprising:
   a request terminal connecting to a wireless network, starting an end-to-end program, and sending a request short message which comprises a name of the end-to-end program and an IP address of the request terminal to a called terminal;
   after the called terminal detects that the received short message is a request short message and a user chooses acception, the called terminal connecting to the wireless network, displaying the end-to-end program in the request short message to the user, after the user starts the end-to-end program and inputs the IP address of the request terminal included in the request short message, the end-to-end program of the called terminal sending a network connection request to the request terminal;
   when the request terminal's own end-to-end program monitors the network connection request sent by the called terminal, the request terminal performing IP-based data interaction with the called terminal;
   wherein, the request terminal comprises:
   a first Internet accessing module, used to connecting to the wireless network before starting the end-to-end program;
   a first list creating module, used to create an end-to-end program list, and store all the end-to-end programs of the request terminal in the list in advance in accordance with a program name, a path, and a version number;
   a request module, used to send the request short message to the called terminal when starting the end-to-end program;
   a first short message receiving module, used to receive a short message and display text of the short message;
   a first data interacting module, used to perform IP-based data interaction with the called terminal when the request terminal's own end-to-end program monitors the network connection request;
   or, the called terminal comprises:
   a second list creating module, used to create an end-to-end program list, and store all of the called terminal's own end-to-end programs in the list in advance in accordance with the program name, the path, and the version number;
   a second short message receiving module, used to display text of the request short message after detecting that the short message is a request short message, to prompt the user to accept the request, and when the user chooses to accept the request, to inform a second Internet accessing module and a parsing module;
   a second Internet accessing module, used to connecting to the wireless network before starting the end-to-end program;
   a parsing module, used to parse the text of the received request short message to get the program name and send the program name to a searching module;
   a searching module, used to search the end-to-end program in the end-to-end program list of the called terminal according to the program name, when the program is searched out, to display the program to the user; otherwise, to prompt the user to search the program manually;

a second data interacting module, used to send the network connection request to the request terminal via the end-to-end program after the user starts the end-to-end program displayed by the searching module and inputs the request terminal's IP address.

2. The method of claim 1, wherein, both the request terminal and the called terminal have the end-to-end program list respectively, the request terminal selects an end-to-end program from the list and start the end-to-end program;
said called terminal parses the request short message text to get the name of the end-to-end program, and searches out the corresponding end-to-end program from the end-to-end program list according to the program name, and displays the end-to-end program to the user.

3. The method of claim 2, when the called terminal cannot search out the corresponding end-to-end program in the end-to-end program list, the method further comprising: the called terminal prompting the user to search the end-to-end program manually.

4. The method of claim 1, after detecting that the received short message is a request short message, the method further comprising: when the user chooses rejection, returning a rejecting short message to the request terminal.

5. The method of claim 4, after returning a rejecting short message to the request terminal, the method further comprising: after the request terminal detects that the received short message is a rejecting short message, displaying a text, and prompting that a peer end makes a rejection.

6. The method of claim 4, wherein, said returning a rejecting short message is: returning a rejecting short message in a rejecting short message format preset by the request terminal and the called terminal;
the rejecting short message format is specifically: a first character is a rejection identity; and a second character is a program name.

7. The method of claim 1, wherein, said sending a request short message is: sending a request short message in a request short message format preset by the request terminal and the called terminal;
the request short message format is specifically: a first character is a request identity; a second character is the name of the end-to-end program; and a third character is a delimiter; and a fourth character is the IP address of the request terminal.

8. The method of claim 7, when the called terminal detects that the received short message is a request short message and the request short message contains a version number, the method further comprising: the user checking the version number before starting the end-to-end program, if the version number is consistent, starting the end-to-end program; otherwise, the user sending a short message to the request terminal as required to notify the request terminal of inconsistence of the version number.

9. The method of claim 1, when the called terminal detects that the received short message is a request short message and the request short message contains a version number, the method further comprising: the user checking the version number before starting the end-to-end program, if the version number is consistent, starting the end-to-end program; otherwise, the user sending a short message to the request terminal as required to notify the request terminal of inconsistence of the version number.

10. The method of claim 1, after the request terminal sends the request short message to the called terminal, the method further comprising: setting time in accordance with a preset time, and when the time expires, prompting the user to close the program.

11. A system for establishing an Internet Protocol (IP) connection between mobile terminals, the system comprising:
a request terminal, used to start an end-to-end program after connecting to a wireless network, and send a request short message which comprises a name of the end-to-end program and an IP address of the request terminal to a called terminal; and also used to perform IP-based data interaction with the called terminal when the end-to-end program of the request terminal monitors a network connection request sent by the called terminal;
a called terminal, used to connect to the wireless network when detecting that the received short message is a request short message and the user accepts the request, and to display the end-to-end program in the request short message to the user, after the user starts the end-to-end program and inputs the IP address of the request terminal included in the request short message, the called terminal's own end-to-end program sending the network connection request to the request terminal;
a wireless network, used to provide a data interaction platform for the request terminal and the called terminal;
wherein, the request terminal comprises:
a first Internet accessing module, used to connecting to the wireless network before starting the end-to-end program;
a first list creating module, used to create an end-to-end program list, and store all the end-to-end programs of the request terminal in the list in advance in accordance with a program name, a path, and a version number;
a request module, used to send the request short message to the called terminal when starting the end-to-end program;
a first short message receiving module, used to receive a short message and display text of the short message;
a first data interacting module, used to perform IP-based data interaction with the called terminal when the request terminal's own end-to-end program monitors the network connection request;
or, the called terminal comprises:
a second list creating module, used to create an end-to-end program list, and store all of the called terminal's own end-to-end programs in the list in advance in accordance with the program name, the path, and the version number;
a second short message receiving module, used to display text of the request short message after detecting that the short message is a request short message, to prompt the user to accept the request, and when the user chooses to accept the request, to inform a second Internet accessing module and a parsing module;
a second Internet accessing module, used to connecting to the wireless network before starting the end-to-end program;
a parsing module, used to parse the text of the received request short message to get the program name and send the program name to a searching module;
a searching module, used to search the end-to-end program in the end-to-end program list of the called terminal according to the program name, when the program is searched out, to display the program to the user; otherwise, to prompt the user to search the program manually;
a second data interacting module, used to send the network connection request to the request terminal via the end-to-end program after the user starts the end-to-end program displayed by the searching module and inputs the request terminal's IP address.

12. The system of claim 11, wherein, the called terminal is further used to return a rejecting short message to the request terminal after the received short message is detected as a request short message and the user rejects the request; and also used to prompt the user to search the end-to-end program manually when the corresponding end-to-end program cannot be searched out in the end-to-end program list;

the request terminal is further used to display the text and prompt that a peer end rejects the request after the received short message is detected as a rejecting short message.

13. The system of claim 11, wherein, the request terminal further comprises: a timing module, used to set a time in accordance with a preset time after sending the request short message, and when the time expires, to prompt the user to close the program; and/or the request terminal further comprises: a version number inputting module, used to prompt the user to input the version number when the request module adds the text of the short message;

the request module is further used to add the version number input by the user into the text of the short message;

the first data interacting module is further used to close the timing module when the end-to-end program of the request terminal monitors the network connection request;

the first short message receiving module is further used to prompt that a peer end rejects the request and close the timing module when the short message is detected as a rejecting short message;

the called terminal also comprises a rejecting module used to return the rejecting short message to the request terminal;

the second short message receiving module is further used to prompt the user to reject the request and notify the rejecting module when the user chooses to reject the request.

14. A mobile terminal for establishing an Internet Protocol connection, when working as a request terminal, the mobile terminal comprising:

a first Internet accessing module, used to connecting to a wireless network before starting an end-to-end program;

a first list creating module, used to store all the end-to-end programs of the request terminal in the list in advance in accordance with a program name, a path, and a version number;

a request module, used to send a request short message to a specified terminal when starting the end-to-end program;

a first short message receiving module, used to receive a short message and display text of the short message;

a first data interacting module, used to perform IP-based data interaction with the specified terminal when the end-to-end program of the request terminal monitors a network connection request;

when working as a called terminal, the mobile terminal comprising:

a second Internet accessing module, used to connecting to a wireless network before starting an end-to-end program;

a second list creating module, used to create an end-to-end program list and store all end-to-end programs of the called terminal in the list in advance in accordance with the program name, the path, and the version number;

a second short message receiving module, used to, after detecting a request short message, display the text of the request short message, prompt the user to accept the request, and, when an accepting button is pressed, to notify the second Internet accessing module and the parsing module;

a second data interacting module, used to send a network connection request via the end-to-end program to a terminal sending the request short message after the user starts the end-to-end program displayed by a searching module and inputs an IP address in the request short message;

a parsing module, used to parse the text of the received request short message to get the program name and send the program name to a searching module;

a searching module, used to search the end-to-end program in the end-to-end program list of the called terminal according to the program name, and when the end-to-end program is searched out, display the end-to-end program to the user; otherwise, prompt the user to search the end-to-end program manually.

15. The mobile terminal of claim 14, when working as the request terminal, the mobile terminal further comprising: a timing module, used to set a time according to a preset time after sending the request short message, and when the set time expires, prompt the user to close the program; and/or, the mobile terminal further comprising: a version number inputting module, used to prompt the user to input the version number when the request module adds the text of the short message;

the request module is further used to add the version number input by the user into the text of the short message;

the first short message receiving module is further used to prompt that a peer end rejects the request and close the timing module when the short message is detected as a rejecting short message;

the first data interacting module is further used to close the timing module when the end-to-end program of the request terminal monitors the network connection request;

when working as the called terminal, the mobile terminal further comprising: a rejecting module, used to return a rejecting short message to a terminal sending the request short message;

the second short message receiving module is also used to prompt the user to reject the request, and notify the rejecting module when a rejecting button is pressed.

* * * * *